United States Patent
Dang et al.

(10) Patent No.: US 11,470,012 B2
(45) Date of Patent: Oct. 11, 2022

(54) SYSTEM AND METHOD FOR QUEUE MANAGEMENT

(71) Applicant: Capital One Services, LLC, McLean, VA (US)

(72) Inventors: Steven Dang, Plano, TX (US);
Elizabeth Furlan, Plano, TX (US);
Chih-Hsiang Chow, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/185,224

(22) Filed: Feb. 25, 2021

(65) Prior Publication Data
US 2022/0272047 A1 Aug. 25, 2022

(51) Int. Cl.
*G06F 15/173* (2006.01)
*H04L 47/625* (2022.01)
(Continued)

(52) U.S. Cl.
CPC ........ *H04L 47/6255* (2013.01); *H04L 43/067* (2013.01); *H04L 43/0817* (2013.01);
(Continued)

(58) Field of Classification Search
CPC ............... H04L 47/6255; H04L 43/067; H04L 43/0817; H04L 43/0882; H04L 43/16; H04L 47/6215
See application file for complete search history.

(56) References Cited

U.S. PATENT DOCUMENTS

| | | | | |
|---|---|---|---|---|
| 8,213,453 B1 * | 7/2012 | Voruganti | ............... | H04L 47/32 370/444 |
| 10,257,071 B2 * | 4/2019 | Baughman | ............. | H04L 43/16 |

(Continued)

FOREIGN PATENT DOCUMENTS

| CN | 109343138 A | 2/2019 |
|---|---|---|
| CN | 110908784 A | 3/2020 |

(Continued)

OTHER PUBLICATIONS

Application Capacity Optimizations with Global Load Balancing: Traffic overflow to other regions (n d.). Google Cloud Solutions, https://cloud.google.com/solutions/about-capacity-optimization-with-global-b#traffic_overflow_to_other_regions.

*Primary Examiner* — Anh Nguyen
(74) *Attorney, Agent, or Firm* — Sterne, Kessler, Goldstein & Fox P.L.L.C.

(57) ABSTRACT

A system and method for queue management is disclosed. The system and method includes at least: (a) monitoring, by one or more computing devices, a network node queue to determine a value indicating how much data is processed by the network node over a period of time; (b) determining, by the one or more computing devices, whether the value is below a threshold value, wherein the value being below the threshold value indicates a performance degradation of the network node; (c) based on determining the value is below the threshold value, removing, by the one or more computing devices, a remaining data from the network node queue; and (d) transmitting, by the one or more computing devices, the remaining data removed in (c) to a coordinator module for redistribution to one or more other network nodes to process the remaining data.

18 Claims, 3 Drawing Sheets

(51) Int. Cl.
　　　*H04L 47/62*　　　　(2022.01)
　　　*H04L 43/0817*　　(2022.01)
　　　*H04L 43/067*　　　(2022.01)
　　　*H04L 43/16*　　　　(2022.01)
　　　*H04L 43/0882*　　(2022.01)

(52) U.S. Cl.
　　　CPC .......... *H04L 43/0882* (2013.01); *H04L 43/16* (2013.01); *H04L 47/6215* (2013.01)

(56) References Cited

U.S. PATENT DOCUMENTS

| | | | |
|---|---|---|---|
| 2003/0095560 A1* | 5/2003 | Arita | H04L 47/30 370/431 |
| 2015/0254692 A1* | 9/2015 | Xu | G06Q 30/02 705/7.33 |
| 2019/0385271 A1 | 12/2019 | Ben Dayan et al. | |

FOREIGN PATENT DOCUMENTS

| CN | 111506434 A | 8/2020 |
|---|---|---|
| CN | 111565154 A | 8/2020 |

* cited by examiner

SYSTEM AND METHOD FOR QUEUE MANAGEMENT

TECHNICAL FIELD

Embodiments relate to systems and methods for queuing technology, specifically queue management systems for processing data in a network.

BACKGROUND

Queuing services are used in a variety of applications and provide a useful way of asynchronously storing data in a buffer or queue until the data is ready to be processed by underlying systems. Current queuing services, however, lack sophistication and are deficient in many ways. For example, current systems operate reactively and recognize problems in the queuing process only after underlying systems completely fail, often leading to the complete stoppage of data processing. This can lead to sudden interruptions of services that require the data within the queue to be processed. Current queuing systems further lack sophistication in rebalancing data when underlying systems fail. This often results in data being stuck in the queue, and that data is either never processed or processed extremely slowly. This also leads to interruptions of services that require the data within the queue to be processed. Thus, a need remains for improved queuing systems that operate proactively to resolve the aforementioned issues before such issues significantly impact services relying on the queuing system to process data.

SUMMARY

Embodiments disclosed herein provide systems and methods for enhanced queue management. The systems and methods improve conventional systems by proactively detecting errors in queuing systems and rebalance data when errors are detected. In embodiments, the systems can perform methods to monitor a network node queue to determine a value indicating how much data is processed by the network node over a period of time. In embodiments, the systems can determine whether the value is below a threshold value, where the value being below the threshold value indicates a performance degradation of the network node. In embodiments, based on determining the value is below the threshold value, the systems remove a remaining data from the network node queue. In embodiments, the systems transmit the remaining data removed for redistribution to one or more other network nodes to process the remaining data.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the disclosure.

DETAILED DESCRIPTION

Figure 1:
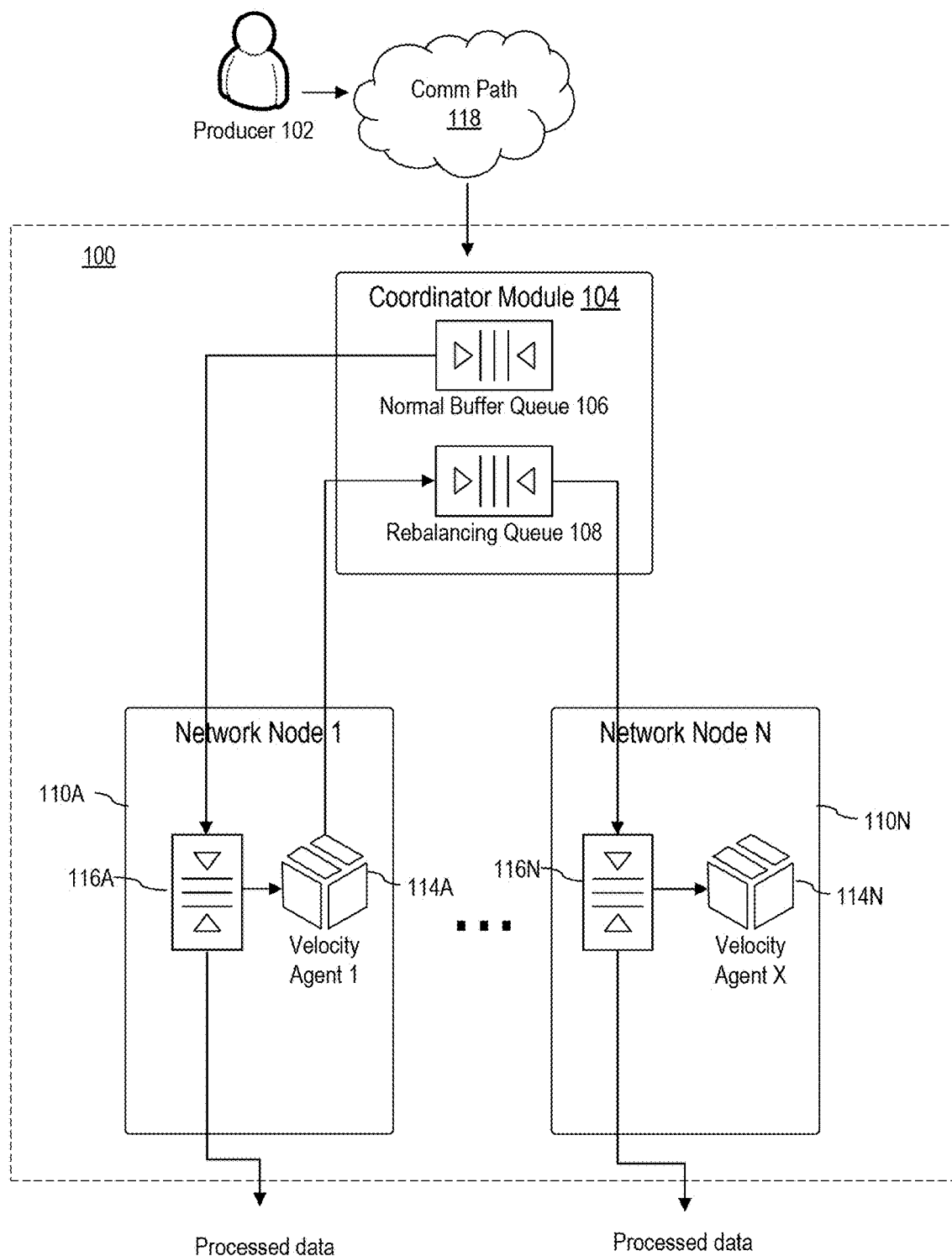
FIG. 1 is a system for queue management in an embodiment of the present disclosure.

Embodiments disclosed herein provide a system and method for queue management. In a number of embodiments, the system and method monitors a queue of a network node to determine a value indicating how much data is processed by the network node over a period of time. The system and method further determine whether the value is below a threshold value, wherein the value being below the threshold value indicates a performance degradation of the network node. Based on determining the value is below the threshold value, a remaining data is removed from the queue and transmitted to a coordinator module for redistribution to one or more other network nodes to process the remaining data.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, a pressure sensor, an inertial sensor, a microelectromechanical system (MEMS), passive devices, or a combination thereof. Further, if a module or unit is written in the system or apparatus claims section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in an embodiment of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

System Overview and Function

FIG. 1 shows a system 100 for queue management in an embodiment of the present disclosure. In a number of embodiments, the system 100 may be part of a backend computing infrastructure, including a server infrastructure of a company or institution. In a number of embodiments, the system 100 may be implemented with units, modules, and sub-modules. For example, the system 100 may include a coordinator module 104. In a number of embodiments, the coordinator module 104 may be coupled to other components of the system 100, such as one or more network nodes 110. The coordinator module 104 functions to manage distribution of data received by a producer 102 amongst the network nodes 110. In FIG. 1, the network nodes 110 are shown as {110A, . . . 110N}. Collectively, the coordinator module 104 and the network nodes 110 comprise the system 100.

The network nodes 110 refer to one or more devices of the system 100 used to process data transmitted to the system 100 by a producer 102. Producer 102 refers to an individual that uses a device or may be a device itself that transmits data to the system 100 for processing. In FIG. 1, the producer 102 is shown as an individual that uses a device, however, this is merely exemplary. The producer 102 may be a device such as a computer or server that can implement software or services that transmits data to the system 100 for processing.

The network nodes 110 may be any of a variety of centralized or decentralized computing devices. For example, the network nodes 110 may be a smart phone, a cellular phone, a tablet computer, a notebook computer, a laptop computer, a desktop computer, grid-computing resources, a virtualized computing resource, cloud computing resources, routers, switches, peer-to-peer distributed computing devices, a server, or a combination thereof. The network nodes 110 may be centralized in a single room, distributed across different rooms, distributed across different geographic locations, or embedded within a communication path 118.

How the system 100 (i.e., the coordinator module 104 and the network nodes 110) implements the novel queue management techniques of the present disclosure will now be described by way of example. In a number of embodiments, the system 100 may function by receiving data transmitted by the producer 102 over a communication path 118. In a number of embodiments, the data transmitted may be received at the coordinator module 104.

The communication path 118 refers to a communication network that can span and represent a variety of networks and network topologies. For example, the communication path 118 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the communication path 118. Cable, Ethernet, digital subscriber line (DSL), fiber optic lines, fiber to the home (FTTH), and plain old telephone service (POTS) are examples of wired communication that may be included in the communication path 118. Further, the communication path 118 can traverse a number of network topologies and distances. For example, the communication path 118 can include direct connection, personal area network (PAN), local area network (LAN), metropolitan area network (MAN), wide area network (WAN), or a combination thereof.

Continuing with the example, the data transmitted from producer 102 to coordinator module 104 may include, for example, images, text based messages, audio files, computer files, software function calls including any variables associated with the same, or any other data that may be placed in a queue data structure. The purpose of transmitting the data is to have the system 100, particularly the network nodes 110 process the data in some manner. By way of example, in a number of embodiments, if the data transmitted by the producer 102 is an image, the network nodes 110 can process the image by, for example, routing the image to a destination where the image is meant to be transmitted. In many embodiments, if the data transmitted by the producer 102 is a text based message, the network nodes 110 can process the text based message by routing the text based message to a destination where the text based message is meant to be transmitted. The aforementioned types of data and processing are not meant to be limiting and are given as examples for ease of description. Other types of data may be transmitted by the producer 102, and other processing techniques may be performed by the network nodes 110.

Continuing with the example, when the coordinator module 104 receives the data transmitted by the producer 102, upon receipt of the data, the coordinator module 104 can enable distribution of the data to the network nodes 110. In a number of embodiments, the coordinator module 104 can enable the distribution of the data by placing the data in a normal buffer queue 106, and distributing the data to the network nodes 110. The normal buffer queue 106 refers to a queue data structure that initially holds the data received from the producer 102. In a number of embodiments, the coordinator module 104 can implement instructions that allows the normal buffer queue 106 to distribute the data to the network nodes 110 in a first-in-first-out (FIFO) manner. Such instructions may be implemented as a push function or a send function with the data as a variable that is transmitted to the network nodes 110. How the distribution is performed depends on implementation of the system 100 and may be customized by an administrator or developer of the system 100. For example, in a number of embodiments, the distribution may be performed randomly to network nodes 110 available to receive the data by having the network nodes 110 alert the coordinator module 104 of their availability to receive the data via a signal, flag, or parameter. In many embodiments, the data received is distributed amongst network nodes 110 according to a predefined order, which is repeated once all network nodes 110 receive data sequentially. In many embodiments, the distribution may be performed based on a predefined set of rules or criteria, implementing logic equivalent to, for example, "IF data is available to send, THEN send the data to network nodes 110 that have fewer than X pieces of data currently being processed", where X is a real number. The aforementioned is merely exemplary and not meant to be limiting. Other distribution methods, rules, and criteria may be used.

Continuing with the example, in a number of embodiments, the data distributed to the network nodes 110 may be received by a network node queue 116 of each of the network nodes 110. In FIG. 1, the network node queue 116 of each of the network nodes 110 is shown as {116A, . . . 116N}. The network node queue 116, similar to the normal buffer queue 106, refers to a queue data structure that holds the data received from the normal buffer queue 106 until it is ready to be processed by each of the network nodes 110.

In a number of embodiments, in order to enable queue management, each of the network nodes 110 can further include a velocity agent 114 coupled to the network node queue 116. In FIG. 1, the velocity agent 114 of each of the network nodes 110 is shown as {114A, . . . 114N}. The velocity agent 114 refers to a device, unit, or module of the network nodes 110, that enables monitoring of the network node queue 116, and enables measurement of how much data is output by the network node queue 116. Based on the monitoring, the velocity agent 114 determines a value indicating how much data is processed by the network node 110 over a period of time. For example, in a number of embodiments, the velocity agent 114 can determine the value by, for example, counting how much data exits the network node queue 116 over a period of time. The period of time may be, for example, seconds, minutes, hours, etc. By way of example, if the data to be processed by the network nodes 110 is an image, and the network node queue 116 has received a number of images from the normal buffer queue 106 stored in the network node queue 116, and the network node queue 116 has Y images exiting the network node queue 116 over a period of time Z, where Y is an integer and Z is a unit of time, the velocity agent 114 can determine the value by equation (1) shown below:

$$\text{Value} = Y/Z \tag{1}$$

In a number of embodiments, the velocity agent 114 can further determine whether the value is below a threshold value. The threshold value refers to a numerical value below which if the value falls, indicates a performance degradation of the network nodes 110. In other words, the threshold value indicates a cutoff value below which it is determined that the network node queue 116 is not outputting data at a fast enough or optimal rate. Thus, if the value falls below the threshold value, it can indicate that a degradation of the network node (i.e., a problem exists with the data processing mechanism of the network node associated with the network node queue 116). In a number of embodiments, the velocity agent 114 can determine whether the value is below the threshold value by performing a comparison of the value determined according to equation (1), and comparing the value to the threshold value. If the value is less than the threshold value, it is determined that there is a performance degradation of the network node and/or the underlying systems processing the data.

The threshold value may be determined in a variety of ways. For example, in a number of embodiments, the threshold value may be a pre-determined value, which is set by an administrator or developer of the system 100. In many embodiments, the threshold value may be determined based on a historic average of data processed by each individual network node of the network nodes 110. In this embodiment, the historic average of data processed by each individual network node may be determined by having the velocity agent 114 monitor how much data is output by the network node queue 116 of a network node and determine an average amount of data output over a period of time. For example, this may be an average of data output over a second, minute, hours, etc. Once an average is determined, that average may be the threshold value, and the velocity agent 114 can compare the value currently output by the network node queue 116 to the threshold value to determine if the value is below the threshold value. In many embodiments, the threshold value may be determined based on a historic average of data processed by a plurality of network nodes 110. In this embodiment, the velocity agent 114 for each of the network nodes 110 can monitor how much data is historically output by the network node queue 116 over a period of time, similar to what was described previously. The averages of each of the network nodes 110 can then further be averaged to determine an average amount of data output across all network nodes 110. The average of the averages can then be the threshold value, and the velocity agent 114 can compare the value currently output by the network node queue 116 to the threshold value to determine if the value is below the threshold value. The aforementioned are merely exemplary and not meant to be limiting. Further methods of determining a threshold value may be implemented.

Continuing with the example and assuming that the velocity agent 114 determines that the value is below the threshold value, in a number of embodiments, the velocity agent 114 can enable removing a remaining data within the network node queue 116 of the network node when the value is below the threshold value, and further enable transmission of the remaining data back to the coordinator module 104 for redistribution to one or more other network nodes 110 to process the remaining data. The remaining data refers to the data within the network node queue 116 that is waiting to be processed by the network node. In this way, the velocity agent 114 can facilitate queue management by proactively removing data to be processed from potentially problematic network nodes 110 to ensure that data is continually processed by the system 100. By way of example, in a number of embodiments, the velocity agent 114 can, upon determining the value is below the threshold value, transmit a signal to the network node to redirect and/or transmit the remaining data to the velocity agent 114 so that the velocity agent 114 can further transmit the remaining data to the coordinator module 104.

In a number of embodiments, assuming the velocity agent 114, determines that the value is below the threshold value, the velocity agent 114 can further generate an alert to a device, unit, or module of the system 100 or external to the system 100 indicating the there is a performance degradation of its associated network node. In a number of embodiments, the alert can be a signal, variable, or parameter generated by the velocity agent 114. For example, the alert can be a character string such as "ALERT: NODE X IS DOWN", where "X" is an identifier identifying the network node, transmitted to the device, unit, or module. In this way, the velocity agent 114 can alert an administrator or developer of the system 100 that one or more of the network nodes 110 needs to be examined to determine the cause of its performance degradation.

In a number of embodiments, the coordinator module 104 can have a rebalancing queue 108 that receives the remaining data. Thus, in a number of embodiments, the velocity agent 114 can transmit the remaining data to the rebalancing queue 108. The rebalancing queue 108, similar to the normal buffer queue 106, refers to a queue data structure that holds the remaining data received from the velocity agent 114 until it is ready to be redistributed to the one or more other network nodes 110. In a number of embodiments, the removal and transmission of the remaining data by the velocity agent 114 to the rebalancing queue 108 may be performed in real-time from when the value is determined to be below the threshold value. Real-time refers to an instance where the removal and transmission of the remaining data is done near instantly from when the velocity agent 114 determines that the value is below the threshold value. In a number of embodiments, rebalancing queue 108 can then redistribute the remaining data based on the same distribution methods, rules, and criteria used by the normal buffer queue 106 to distribute the data, to the one or more other network nodes 110. In a number of embodiments, the redistribution of the remaining data can further be done in real-time from when the rebalancing queue 108 receives the remaining data.

The modules and services described in FIG. 1 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

It has been discovered that the system 100 described above significantly improves the state of the art from previous queuing systems because it introduces a novel way to proactively detect degradation in network nodes 110 and underlying systems. The system 100 is proactive through its use of the velocity agent 114, which allows the system 100 to detect performance degradation in network nodes 110, and based on the same, redistribute the data from potentially problematic network nodes 110 to one or more other network nodes 110 to process. In this way, the system 100 allows data transmitted by a producer 102 to be continually processed in an uninterrupted manner. This is a significant improvement over existing systems, which wait until complete failure of a network node or the underlying systems that process the data before determining that the data must be redirected to the one or more other network nodes 110 for processing.

It has been further discovered that the system 100 described above significantly improves the state of the art because it implements a novel way of removing, transmitting, and redistributing the remaining data from network node queues 116 in real-time from when degradation in queuing services and underlying systems is detected. This removing, transmitting, and redistributing the remaining data in real-time allows the system to quickly rebalance data, and as a result, reduces any negative effects, in terms of downtime, latency, or processing output, due to problematic network nodes 110 and underlying systems.

Methods of Operation

Figure 2:
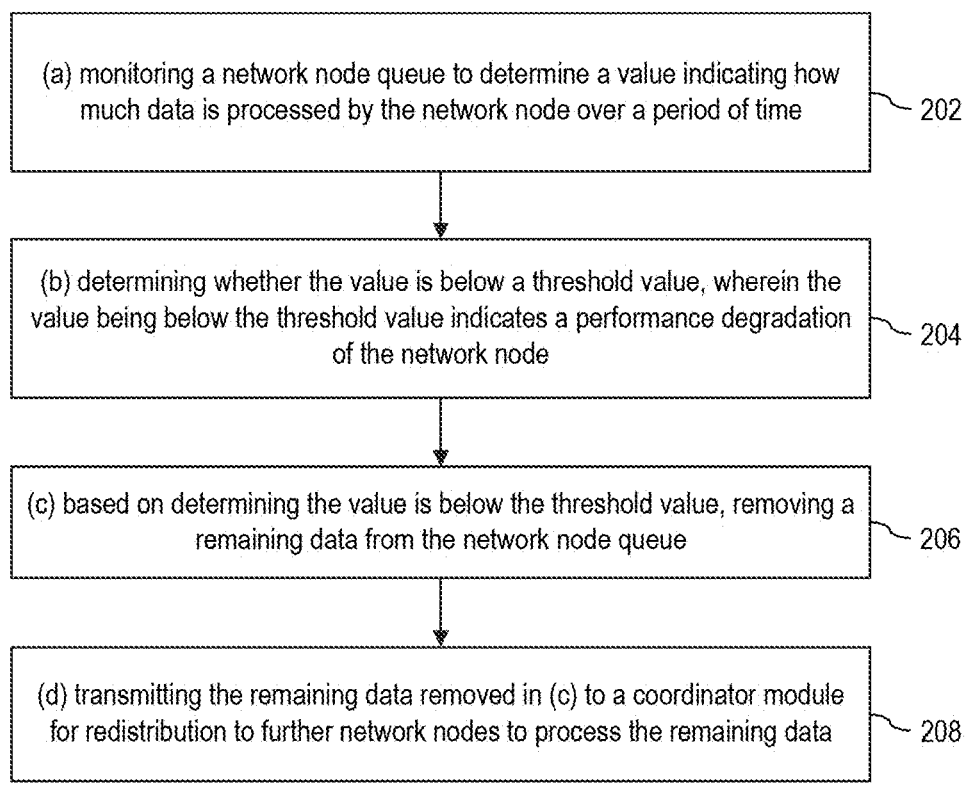
FIG. 2 is an example method of operating the system in an embodiment of the present disclosure.

FIG. 2 shows an example method 200 of operating the system 100 in an embodiment of the present disclosure. The method 200 includes, (a) monitoring a network node queue, for example network node queue 116A, to determine a value indicating how much data is processed by the network node over a period of time, as shown in 202. The method 200 further includes, (b) determining whether the value is below a threshold value, wherein the value being below the threshold value indicates a performance degradation of the network node, for example network node 110A, as shown in 204, and (c) based on determining the value is below the threshold value, removing a remaining data from the network node queue, for example network node queue 116A, as shown in 206. The method 200 further includes, (d) transmitting the remaining data removed in (c) to a coordinator module 104 for redistribution to one or more other network nodes 110 to process the remaining data, as shown in 208. The operations of method 200 are performed, for example, by system 100, in accordance with embodiments described above.

Components of the System

Figure 3:
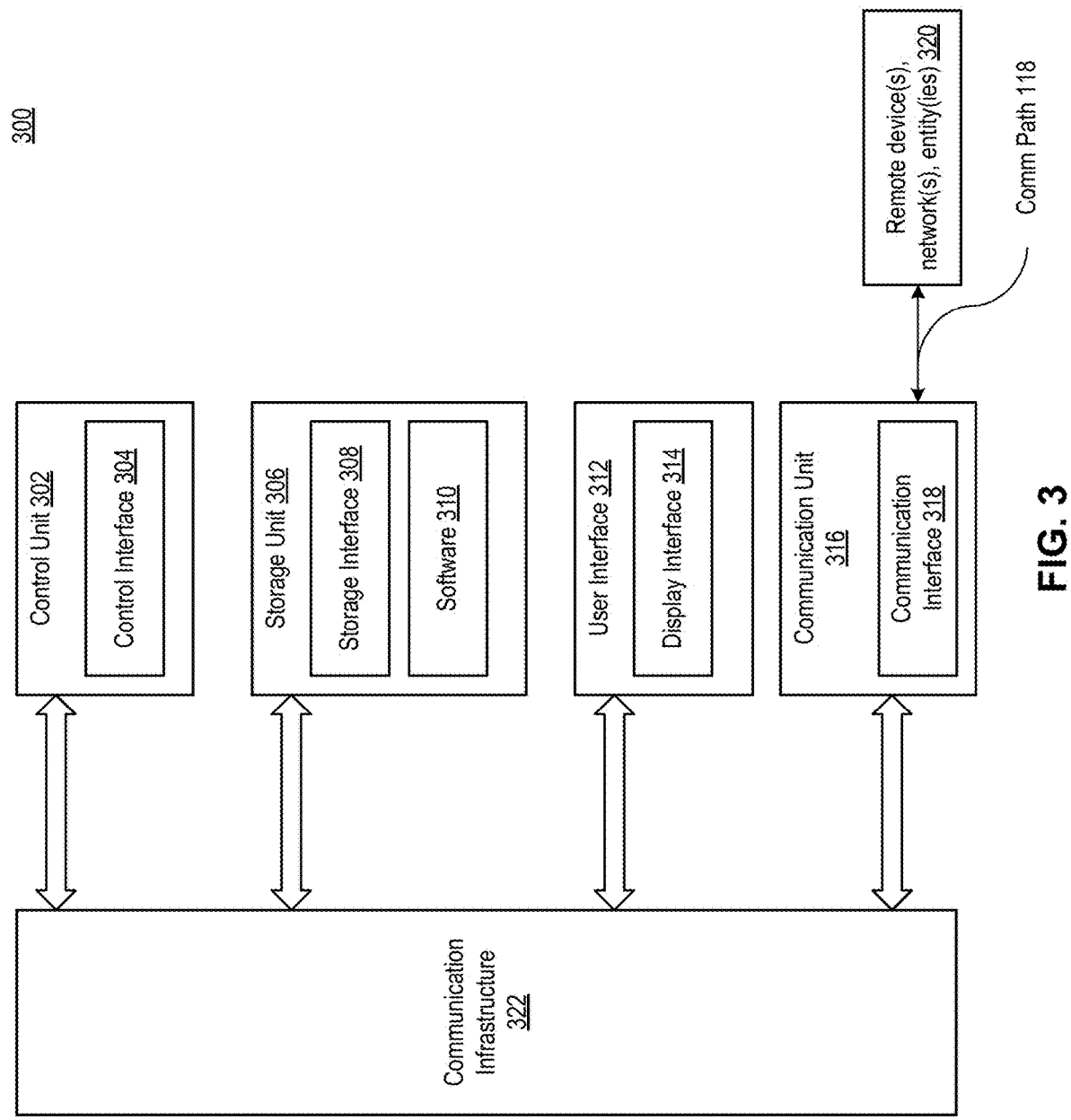
FIG. 3 is an example architecture of the components implementing the system in an embodiment of the present disclosure.

FIG. 3 shows an example architecture 300 of the components implementing the system 100 in an embodiment of the present disclosure. In a number of embodiments, the components may include a control unit 302, a storage unit 306, a communication unit 316, and a user interface 312. The control unit 302 may include a control interface 304. The control unit 302 may execute a software 310 to provide some or all of the intelligence of the system 100. The control unit 302 may be implemented in a number of different ways. For example, the control unit 302 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 304 may be used for communication between the control unit 302 and other functional units or devices of the system 100. The control interface 304 may also be used for communication that is external to the functional units or devices of the system 100. The control interface 304 may receive information from the functional units or devices of the system 100, or from remote devices 320, or may transmit information to the functional units or devices of the system 100 or to remote devices 320. The remote devices 320 refer to units or devices external to the system 100.

The control interface 304 may be implemented in different ways and may include different implementations depending on which functional units or devices of the system 100 or remote devices 320 are being interfaced with the control unit 302. For example, the control interface 304 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 304 may be connected to a communication infrastructure 322, such as a bus, to interface with the functional units or devices of the system 100 or remote devices 320.

The storage unit 306 may store the software 310. For illustrative purposes, the storage unit 306 is shown as a single element, although it is understood that the storage unit 306 may be a distribution of storage elements. Also for illustrative purposes, the storage unit 306 is shown as a single hierarchy storage system, although it is understood that the storage unit 306 may be in a different configuration. For example, the storage unit 306 may be formed with different storage technologies forming a memory hierarchical system including different levels of caching, main memory, rotating media, or off-line storage. The storage unit 306 may be a volatile memory, a nonvolatile memory, an internal memory, an external memory, or a combination thereof. For example, the storage unit 306 may be a nonvolatile storage such as nonvolatile random access memory (NVRAM), Flash memory, disk storage, or a volatile storage such as static random access memory (SRAM) or dynamic random access memory (DRAM).

The storage unit 306 may include a storage interface 308. The storage interface 308 may be used for communication between the storage unit 306 and other functional units or devices of the system 100. The storage interface 308 may also be used for communication that is external to the system 100. The storage interface 308 may receive information from the other functional units or devices of the system 100 or from remote devices 320, or may transmit information to the other functional units or devices of the system 100 or to remote devices 320. The storage interface 308 may include different implementations depending on which functional units or devices of the system 100 or remote devices 320 are being interfaced with the storage unit 306. The storage interface 308 may be implemented with technologies and techniques similar to the implementation of the control interface 304.

The communication unit 316 may enable communication to devices, components, modules, or units of the system 100 or to remote devices 320. For example, the communication unit 316 may permit the system 100 to communicate between its components such as the coordinator module 104 and the network nodes 110. The communication unit 316 may further permit the devices of the system 100 to communicate with remote devices 320 such as an attachment, a peripheral device, or a combination thereof through a communication path 118, such as a wireless or wired network.

The communication path 118, as previously described with respect to FIG. 1, may span and represent a variety of networks and network topologies. For example, the communication path 118 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the communication path 118. Cable, Ethernet, digital subscriber line (DSL), fiber optic lines, fiber to the home (FTTH), and plain old telephone service (POTS) are examples of wired communication that may be included in the communication path 118. Further, the communication path 118 may traverse a number of network topologies and distances. For example, the communication path 118 may include direct connection, personal area network (PAN), local area network (LAN), metropolitan area network (MAN), wide area network (WAN), or a combination thereof.

The communication unit 316 may also function as a communication hub allowing the system 100 to function as part of the communication path 118 and not be limited to be an end point or terminal unit to the communication path 118. The communication unit 316 may include active and passive components, such as microelectronics or an antenna, for interaction with the communication path 118.

The communication unit 316 may include a communication interface 318. The communication interface 318 may be used for communication between the communication unit 316 and other functional units or devices of the system 100 or to remote devices 320. The communication interface 318 may receive information from the other functional units or devices of the system 100, or from remote devices 320, or may transmit information to the other functional units or devices of the system 100 or to remote devices 320. The communication interface 318 may include different implementations depending on which functional units or devices are being interfaced with the communication unit 316. The communication interface 318 may be implemented with technologies and techniques similar to the implementation of the control interface 304.

The user interface 312 may present information generated by the system 100. In a number of embodiments, the user interface 312 allows a user of the system 100 or a producer 102 to interface with the devices of the system 100 or remote devices 320. The user interface 312 may include an input device and an output device. Examples of the input device of the user interface 312 may include a keypad, buttons, switches, touchpads, soft-keys, a keyboard, a mouse, or any combination thereof to provide data and communication inputs. Examples of the output device may include a display interface 314. The control unit 302 may operate the user interface 312 to present information generated by the system 100. The control unit 302 may also execute the software 310 to present information generated by the system 100, or to control other functional units of the system 100. The display interface 314 may be any graphical user interface such as a display, a projector, a video screen, or any combination thereof.

The above detailed description and embodiments of the disclosed system 100 are not intended to be exhaustive or to limit the disclosed system 100 to the precise form disclosed above. While specific examples for the system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method 200 and system 100 is cost-effective, highly versatile, and accurate, and may be implemented by adapting components for ready, efficient, and economical manufacturing, application, and utilization. Another important aspect of embodiments of the present disclosure is that it valuably supports and services the historical trend of reducing costs, simplifying systems, and/or increasing performance.

These and other valuable aspects of the embodiments of the present disclosure consequently further the state of the technology to at least the next level. While the disclosed embodiments have been described as the best mode of implementing the system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer implemented method for queue management, the method comprising:
    (a) monitoring, by one or more computing devices, a network node queue to determine a value indicating how much data is processed by a network node over a period of time;
    (b) determining, by the one or more computing devices, whether the value is below a threshold value, wherein the value being below the threshold value indicates a performance degradation of the network node, wherein the threshold value is determined based on computing an average amount of data output across a plurality of network nodes over the period of time;

(c) based on determining the value is below the threshold value, removing, by the one or more computing devices, remaining data from the network node queue; and (d) transmitting, by the one or more computing devices, the remaining data removed in (c) to a rebalancing queue of a coordinator module for redistribution to one or more other network nodes to process the remaining data.

2. The computer implemented method of claim 1, wherein removing the remaining data in (c) is performed in real-time from when the value is determined to be below the threshold value.

3. The computer implemented method of claim 1, wherein the data and the remaining data are: images, text based messages, audio files, or computer files.

4. The computer implemented method of claim 1, further comprising determining, by the one or more computing devices, the threshold value based on a historic average of data processed by the network node.

5. The computer implemented method of claim 1, further comprising determining, by the one or more computing devices, the threshold value based on a historic average of data processed by a plurality of network nodes.

6. The computer implemented method of claim 1, wherein the threshold value is pre-determined.

7. A non-transitory computer readable medium including instructions for a computing system for queue management, the instructions comprising:

(a) monitoring a network node queue to determine a value indicating how much data is processed by a network node over a period of time;

(b) determining whether the value is below a threshold value, wherein the value being below the threshold value indicates a performance degradation of the network node, wherein the threshold value is determined based on computing an average amount of data output across a plurality of network nodes over the period of time;

(c) based on determining the value is below the threshold value, removing remaining data from the network node queue; and (d) transmitting the remaining data removed in (c) to a rebalancing queue of a coordinator module for redistribution to one or more other network nodes to process the remaining data.

8. The non-transitory computer readable medium of claim 7, with instructions wherein removing the remaining data in (c) is performed in real-time from when the value is determined to be below the threshold value.

9. The non-transitory computer readable medium of claim 7, with instructions wherein the data and the remaining data are: images, text based messages, audio files, or computer files.

10. The non-transitory computer readable medium of claim 7, instructions further comprising determining the threshold value based on a historic average of data processed by the network node.

11. The non-transitory computer readable medium of claim 7, with instructions further comprising determining the threshold value based on a historic average of data processed by a plurality of network nodes.

12. The non-transitory computer readable medium of claim 7, with instructions wherein the threshold value is pre-determined.

13. A computing system for queue management comprising:

a memory to store instructions;
a processor, coupled to the memory, configured to process the instructions to:

(a) monitor a network node queue to determine a value indicating how much data is processed by a network node over a period of time, (b) determine whether the value is below a threshold value, wherein the value being below the threshold value indicates a performance degradation of the network node, wherein the threshold value is determined based on computing an average amount of data output across a plurality of network nodes over the period of time, (c) based on determining the value is below the threshold value, remove remaining data from the network node queue; and a communication unit including microelectronics, coupled to the processor, configured to:

(d) transmit the remaining data removed in (c) to a rebalancing queue of a coordinator module for redistribution to one or more other network nodes to process the remaining data.

14. The computing system of claim 13, wherein the processor is further configured to remove the remaining data in (c) in real-time from when the value is determined to be below the threshold value.

15. The computing system of claim 13, wherein the data and the remaining data are: images, text based messages, audio files, or computer files.

16. The computing system of claim 13, wherein the processor is further configured to determine the threshold value based on a historic average of data processed by the network node.

17. The computing system of claim 13, wherein the processor is further configured to determine the threshold value based on a historic average of data processed by a plurality of network nodes.

18. The computing system of claim 13, wherein the threshold value is pre-determined.

* * * * *